No. 691,410. Patented Jan. 21, 1902.
B. K. SCHMERTZ.
TOASTER.
(Application filed May 11, 1901.)
(No Model.)
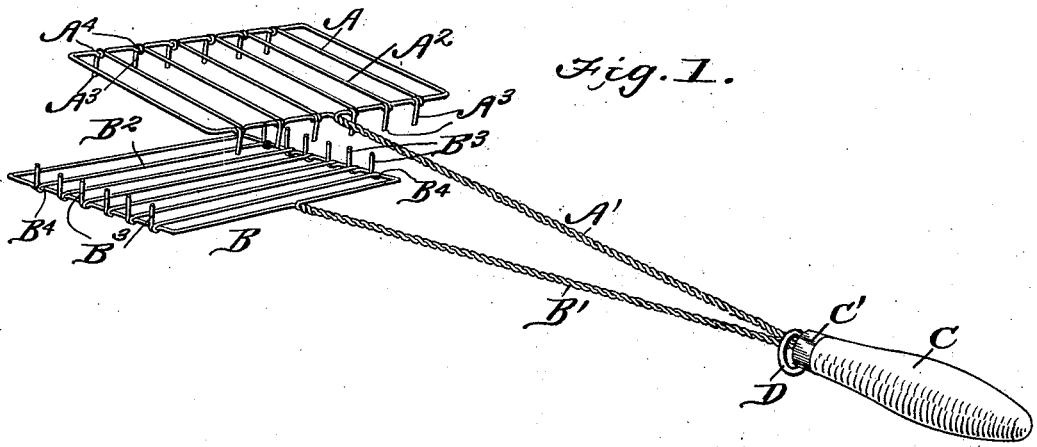
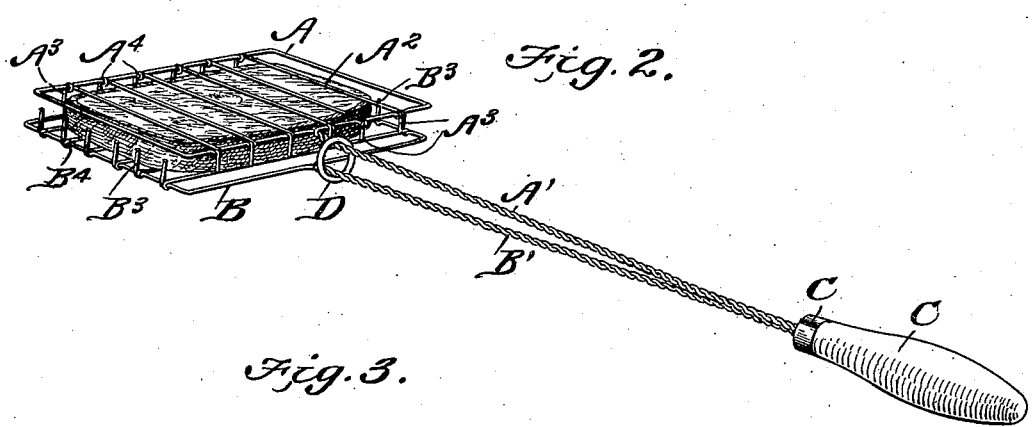
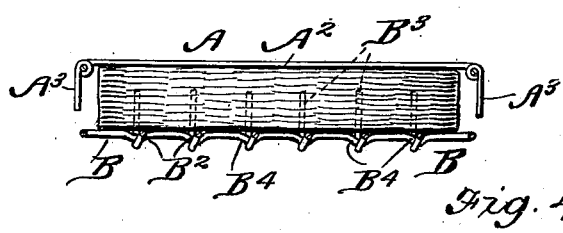
Witnesses
Inventor
Bessie K. Schmertz.
By
Attorneys

UNITED STATES PATENT OFFICE.

BESSIE K. SCHMERTZ, OF PITTSBURG, PENNSYLVANIA.

TOASTER.

SPECIFICATION forming part of Letters Patent No. 691,410, dated January 21, 1902.

Application filed May 11, 1901. Serial No. 59,855. (No model.)

*To all whom it may concern:*

Be it known that I, BESSIE K. SCHMERTZ, a citizen of the United States, residing at Pittsburg, in the county of Allegheny and State of Pennsylvania, have invented a new and useful Toaster, of which the following is a specification.

This invention is an improved construction of toaster or broiler, the object being to provide a toaster which shall be as cheap and simple as those now in use and one which will prevent the slice of bread slipping from between the toasting-frames when reversing the toaster; and with this object in view the invention consists, essentially, in providing the toasting-frames with oppositely-disposed side and end guards, so that the slice of bread is prevented passing beyond the end of the frame.

The invention consists also in certain details of construction hereinafter set forth, and pointed out in the claims.

In the drawings forming part of this specification, Figure 1 is a perspective view of a toaster constructed in accordance with my invention. Fig. 2 is a perspective view showing the practical application of the same. Fig. 3 is a sectional elevation. Fig. 4 is a detail perspective illustrating the peculiar manner of constructing the parts of the toaster.

In carrying out my invention I employ two toasting-frames A and B, which are formed of stout wire and connected to a handle C by means of rods or shanks A' and B', respectively. In practice I prefer to construct the toaster-frames and the shanks or rods from a single piece of wire, the frame being bent, essentially, in the form of a square or rectangle and the ends of the wire twisted to provide the rod or shank A' and B', the extreme ends of the wire being inserted in the handle and secured by means of a suitable ferrule C'. Cross-wires $A^2$ extend across the frame A in parallel longitudinal order, as shown, and cross-wires $B^2$ extend across the frame B in parallel transverse order, and the ends $A^3$ of the wires $A^2$ are projected downwardly at each end, or in a direction toward the frame B, while the ends $B^3$ of the wires $B^2$ are projected upwardly at each side or toward the frame, as most clearly shown. These oppositely-projecting ends form a complete guard surrounding the toaster-frame and preventing the slice of bread slipping from the toaster when the same is reversed.

It will be understood that the frame may be made of any suitable size or shape and the cross-wires may be connected in any suitable manner; but I prefer to have depressions $A^4$ and $B^4$ produced in the side and end members of the upper and lower frames, respectively, the cross-wires $A^2$ and $B^2$ being seated in the said depressions and wrapped around the member at said depression prior to being projected toward the opposite frame. This construction is exceedingly cheap and simple and locks the cross-wire against movement upon the frame. A ring D slides upon the shank or rod portions for the purpose of fastening the frames together. It will thus be seen that I provide a toaster which will securely hold a slice of bread between the frames while being reversed and one which is as cheap, simple, and durable as the ordinary toaster now in use.

Having thus fully described my invention, what I claim as new, and desire to secure by Letters Patent, is—

1. A toaster comprising a handle, shanks or rod portions, and the rectangular-shaped frames attached to the said shanks, the end members of one frame having depressions or recesses and the side members of the opposing frame having similar depressions or recesses, and the cross-wires extending across the frames, said cross-wires being located in the depressions, the ends of said wires being coiled around the members of the frame at that point and projected beyond the said frame at a right angle to the plane of the frame, thereby providing side and end guards, substantially as described.

2. A toaster comprising in combination a handle, the shanks attached to the said handle, a rectangular-shaped frame, arranged at the opposite end of each shank, one frame having wire extending from side to side, the other frame having wire extending from end to end, the ends of each wire being bent toward the opposing frame, thereby providing side and end guards, and a ring sliding upon the shanks to hold the frames together, substantially as set forth.

BESSIE K. SCHMERTZ.

Witnesses:
 EDWARD A. SCHMERTZ,
 JAMES B. ADAMS.